United States Patent
Cui et al.

(10) Patent No.: US 11,284,321 B2
(45) Date of Patent: Mar. 22, 2022

(54) VOICE CALL CONTROL METHOD, VOICE CALL CONTROL DEVICE, AND STORAGE MEDIUM

(71) Applicant: BEIJING XIAOMI MOBILE SOFTWARE CO., LTD., Beijing (CN)

(72) Inventors: Hengbin Cui, Beijing (CN); Long Sun, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/745,488

(22) Filed: Jan. 17, 2020

(65) Prior Publication Data

US 2021/0092660 A1    Mar. 25, 2021

(30) Foreign Application Priority Data

Sep. 23, 2019   (CN) .......................... 201910901370.5

(51) Int. Cl.
| | |
|---|---|
| *H04W 4/00* | (2018.01) |
| *H04W 36/18* | (2009.01) |
| *H04W 36/00* | (2009.01) |
| *H04L 5/14* | (2006.01) |
| *H04W 24/10* | (2009.01) |

(52) U.S. Cl.
CPC .......... *H04W 36/18* (2013.01); *H04L 5/1469* (2013.01); *H04W 24/10* (2013.01); *H04W 36/0058* (2018.08); *H04W 36/0094* (2013.01)

(58) Field of Classification Search
CPC ....... H04W 4/02; H04W 4/029; H04W 36/00; H04W 36/0011; H04W 36/0016; H04W 36/0058; H04W 36/0061; H04W 36/0072; H04W 36/0077; H04W 36/0085; H04W 36/0088

See application file for complete search history.

(56) References Cited

U.S. PATENT DOCUMENTS

| | | | |
|---|---|---|---|
| 2005/0272426 A1* | 12/2005 | Yang | ...................... H04W 36/30 455/436 |
| 2012/0039197 A1 | 2/2012 | Jang et al. | |
| 2012/0244903 A1* | 9/2012 | Fong | ....................... H04W 8/20 455/517 |

(Continued)

FOREIGN PATENT DOCUMENTS

| | | |
|---|---|---|
| WO | 2011085660 A1 | 7/2011 |
| WO | 2018111004 A1 | 6/2018 |

OTHER PUBLICATIONS

Extended European Search Report in U.S. Appl. No. 20/159,369, dated Sep. 10, 2020.

*Primary Examiner* — Matthew W Genack
(74) *Attorney, Agent, or Firm* — Syncoda LLC; Feng Ma

(57) ABSTRACT

A voice call control method includes: measuring a target cell during a voice call; reporting a measurement result when the measurement result satisfies a measurement report optimization condition in which it is included to improve a measurement report condition for the terminal to make a handover to an anchor cell with a current network type; receiving a report response of the measurement result, and making a handover to the target cell to perform a voice call based on the report response of the measurement result. As such, a probability of occurrence of silence or disconnection during a voice call can be reduced.

20 Claims, 4 Drawing Sheets

(56) References Cited

U.S. PATENT DOCUMENTS

| | | | |
|---|---|---|---|
| 2014/0126544 A1 | 5/2014 | Khay-Ibbat et al. | |
| 2015/0208311 A1* | 7/2015 | Lee | H04W 36/30 |
| | | | 455/436 |
| 2016/0219474 A1 | 7/2016 | Singh et al. | |
| 2017/0094628 A1* | 3/2017 | Miao | H04W 36/08 |
| 2018/0359672 A1* | 12/2018 | Keller | H04L 67/141 |
| 2019/0132755 A1 | 5/2019 | Dhanapal et al. | |

* cited by examiner

VOICE CALL CONTROL METHOD, VOICE CALL CONTROL DEVICE, AND STORAGE MEDIUM

CROSS-REFERENCE TO RELATED APPLICATION

This application claims priority to Chinese Patent Application 201910901370.5 filed on Sep. 23, 2019, the disclosure of which is hereby incorporated by reference in its entirety.

BACKGROUND

With the development of communications technology, Long Term Evolution (LTE) network has essentially achieved a full coverage, and 5th Generation (5G) New Radio (NR) technique has also been developed.

In the related art, LTE network and 5G NR network coexist. 5G NR network still needs to support high-definition voice calls, for example, 5G NR network will still use the Voice over LTE (VoLTE) services. However, in the 5G NR network, silence or disconnection sometimes occurs during high-definition voice calls which apply VoLTE services.

SUMMARY

The present disclosure generally relates to the field of communications technology, and more specifically, to a voice call control method, a voice call control device, and a storage medium.

The present disclosure provides a voice call control method, a voice call control device, and a storage medium.

According to an aspect of embodiments of the present disclosure, there is provided a voice call control method, applied to a terminal, and the method comprises:

measuring a target cell during a voice call; reporting a measurement result when the measurement result satisfies a measurement report optimization condition in which it is included to improve a measurement report condition for the terminal to make a handover to an anchor cell with a current network type; and receiving a report response of the measurement result and making a handover to the target cell to perform a voice call based on the report response of the measurement result.

In some embodiments, the voice call control method further comprises:

acquiring a handover control message sent by a network device, and determining the measurement report optimization condition based on the handover control message including the measurement report optimization condition; or determining the measurement report optimization condition according to a pre-configuration message including the measurement report optimization condition.

In some embodiments, the measurement report optimization condition includes:

a priority at which the terminal reports an anchor cell with a non-current network type;

wherein the priority at which the terminal reports an anchor cell with a non-current network type is lower than a priority at which the terminal reports an anchor cell with the current network type.

In some embodiments, the measurement report optimization condition includes:

a voice quality report threshold when the terminal performs a voice call in an anchor cell with a non-current network type;

wherein the voice quality report threshold when the terminal performs a voice call in an anchor cell with a non-current network type is higher than a voice quality report threshold when the terminal performs a voice call in an anchor cell with a current network type.

In some embodiments, the anchor cell with the non-current network type is a cell operating in the time division duplex band, and the anchor cell with the current network type is a cell operating in the frequency division duplex band.

In some embodiments, the current network type is a 5G new radio network type.

According to another aspect of embodiments of the present disclosure, there is provided a voice call control device, applied to a terminal and comprising:

a processor, which is configured to:

measure a target cell during a voice call;

report a measurement result when the measurement result satisfies a measurement report optimization condition in which it is included to improve a measurement report condition for the terminal to make a handover to an anchor cell with a current network type; and receive a report response to the measurement result and make a handover to the target cell for a voice call based on the report response of the measurement result.

In some embodiments, the processor is further configured to:

acquire a handover control message sent by a network device, and determine the measurement report optimization condition based on the handover control message including the measurement report optimization condition; or determine the measurement report optimization condition according to a pre-configuration message including the measurement report optimization condition.

In some embodiments, the measurement report optimization condition includes:

a priority at which the terminal reports an anchor cell with a non-current network type;

wherein the priority at which the terminal reports an anchor cell with a non-current network type is lower than a priority at which the terminal reports an anchor cell with the current network type.

In some embodiments, the measurement report optimization condition includes:

a voice quality report threshold when the terminal performs a voice call in an anchor cell with a non-current network type;

wherein the voice quality report threshold when the terminal performs a voice call in an anchor cell with a non-current network type is higher than a voice quality report threshold when the terminal performs a voice call in an anchor cell with a current network type.

In some embodiments, the anchor cell with the non-current network type is a cell operating in the time division duplex band, and the anchor cell with the current network type is a cell operating in the frequency division duplex band.

In some embodiments, the current network type is a 5G new radio network type.

According to yet another aspect of embodiments of the present disclosure, there is provided a voice call control device, comprising:

a processor;

a memory for storing instructions executable to the processor;

wherein the processor is configured to execute the voice call control method according to any one of the previous aspects or examples.

According to still yet another aspect of embodiments of the present disclosure, there is provided a non-transitory computer-readable storage medium, when instructions in said storage medium are executed by a processor of a mobile terminal, the mobile terminal is enabled to perform the voice call control method according to any one of the previous aspects or examples.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the disclosure and, together with the specification, serve to explain the principles of the disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
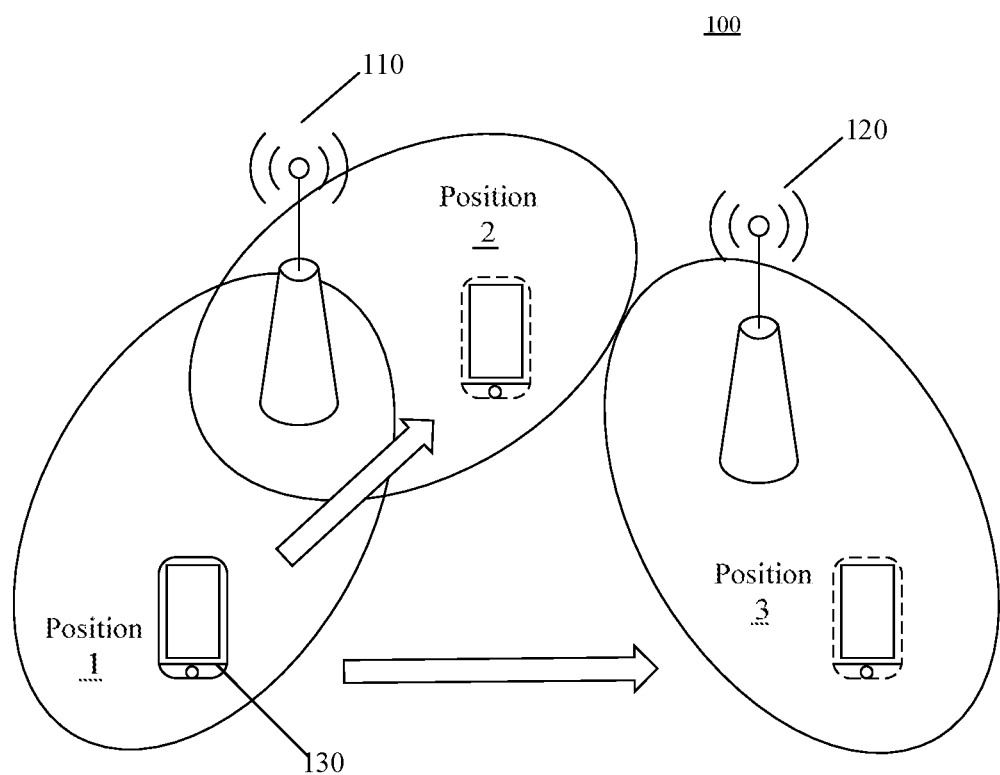
FIG. 1 is a schematic diagram of a radio communication system according to some exemplary embodiments.

The voice call control method provided by the present disclosure can be applied to a radio communication system 100 shown in FIG. 1. Referring to FIG. 1, the radio communication system 100 includes a network device 110, a network device 120, and a terminal 130. The terminal 130 is connected to and performs data transmission with the network device 110 and the network device 120 through radio resources.

It can be understood that, the radio communication system 100 shown in FIG. 1 is only a schematic illustration, and the radio communication system 100 may further include other network devices, such as a core network device, a radio relay device, a radio backhaul device and so on, which are not shown in FIG. 1. The embodiments of the present disclosure make no limitation to the number of network devices and the number of terminals included in the radio communication system.

It can be further understood that, the radio communication system in the embodiments of the present disclosure is a network that provides a radio communication function. The radio communication system can communicate by using different network types. For example, code division multiple access (CDMA), wideband code division multiple access (WCDMA), time division multiple access (TDMA), frequency division multiple access (FDMA), orthogonal frequency-division multiple access (OFDMA), Single Carrier FDMA (SC-FDMA), Carrier Sense Multiple Access with Collision Avoidance. The network type can be divided, according to different network capacity, speed, delay and other factors, into 2G (Generation) network, 3G network, 4G network, or future evolved network, such as 5G network, which may be also referred to as New Radio (NR) network. For convenience of description, the wireless communication network is sometimes abbreviated simply as a network in the present disclosure.

Further, the network device 110 and the network device 120 involved in the present disclosure can also be referred to as radio access network devices. The radio access network device can be a base station, an evolved base station (evolved node B), a home base station, an access point (AP) in a wireless fidelity (WIFI) system, a radio relay node, a radio backhaul node, a transmission point (TP), or a transmission and reception point (TRP), and can also be a gNB in an NR system, or can be components or part of devices that constitutes a base station. It should be understood that, in the embodiments of the present disclosure, no limitation is made to the specific technique and specific device form adopted by the network device. In the present disclosure, the network device can provide communication coverage for a specific geographic area, and can communicate with terminals located within the coverage area (cell). Herein, the network device provides services for a cell, and the terminal communicates with the network device through a transmission resource (for example, a frequency domain resource) used by the cell, the cell can be a cell corresponding to the network device (for example, a base station). Here, the cell can belong to the base station. In the present disclosure, the cell and the base station are often used interchangeably, and those skilled in the art should understand the meaning thereof.

Further, the terminal 130 involved in the present disclosure can also be referred to as a terminal equipment, a User Equipment (UE), a Mobile Station (MS), a Mobile Terminal (MT), etc., it is an equipment that provides voice and/or data connectivity to the user. For example, the terminal can be a handheld device with a wireless connection function, a vehicle-mounted device with a wireless connection function, and the like. At present, some examples of the terminals are: mobile phone, pocket personal computer (PPC), handheld computer, personal digital assistant (PDA), laptop, tablet, wearable device, or vehicle equipment, etc. It should be understood that, the embodiments of the present disclosure make no limitation to the specific technology and specific device forms adopted by the terminal.

The embodiments of the present disclosure are mainly applicable to a scenario where the terminal 130 supports voice calls under multiple network types deployed in a network. For example, the terminal 130 supports making VoLTE voice calls in a 4G network and a 5G NR network. During a voice call, the terminal 130 may have a communication scenario of performing cell handover. In the following description of the embodiments of the present disclosure, the handover of the terminal 130 from a source cell to a target cell will be taken as an example for description. It should be understood that, the source cell and the target cell here can be two different cells under the same base station, or two cells under different base stations. As shown in FIG. 1, the terminal 130 in the source base station 110 can handover from a position 1 (the source cell) to a position 2 (the target cell) to implement handover between different cells under the same base station 110; the terminal 130 can also handover from the source base station 110 to the target base station 120, as shown in FIG. 1, the handover from a position 1 (the source cell) to a position 3 (the target cell), to implement the handover between different cells under different base stations. For the two handover scenarios, the handover is performed both in unit of cell, as for whether the source cell and the target cell are located in the same base station, no limitation is made in the present disclosure.

At present, a situation of call abnormality such as silence or disconnection may occur during a voice call performed by the terminal 130. During the implementation of the embodiments of the present disclosure, it is found that the situation of call abnormality (such as silence or disconnection) occurred to the terminal often occurs in the scenario where the cell handover is performed by the terminal 130, and in the scenario where the network type of the cell after the handover of terminal 130 and the network type of the cell before the handover of the terminal is different. For example, when the terminal 130 is registered with the 5G NR network type, the call abnormality such as silence or disconnection will occur during the 5G VoLTE voice call that is made under the 5G NR network type, and it is found that whenever the silence or disconnection occurs, the terminal 130 is encountered to perform the cell handover, and the band of the target cell after the handover is not the band in which the 5GNR network type operates (not the B3+N78 band). For example, the band of the target cell to which the terminal 130 makes a handover is band39 or band40, etc.

In the related art, a network device sends a measurement control message to a terminal, and the terminal performs cell measurement based on the measurement control message, such as performing measurements of Reference Signal Receiving Power (RSRP), Reference Signal Receiving Quality (RSRQ), etc. The measurement control message sent by the network device to the terminal also includes a measurement report condition for the terminal to report the measurement result. When the measurement result satisfies the measurement report condition, the terminal reports the measurement result to the network device. The network device determines whether to perform cell handover based on the measurement result reported by the terminal, and sends a report response of the measurement result to the terminal. When it is determined to perform cell handover, the terminal performs cell handover, switches from the source cell to the target cell, and performs a voice call collectively in the target cell.

In view of this, the present disclosure provides a voice call control method that optimizes the measurement report condition for a terminal to report a measurement result during a voice call, which is hereinafter referred to as a measurement report optimization condition. Through the measurement report optimization condition, the probability of the terminal making a handover to an anchor cell with the current network type is increased, and thus the probability of abnormal call occurrence during a voice call of the terminal is reduced.

Figure 2:
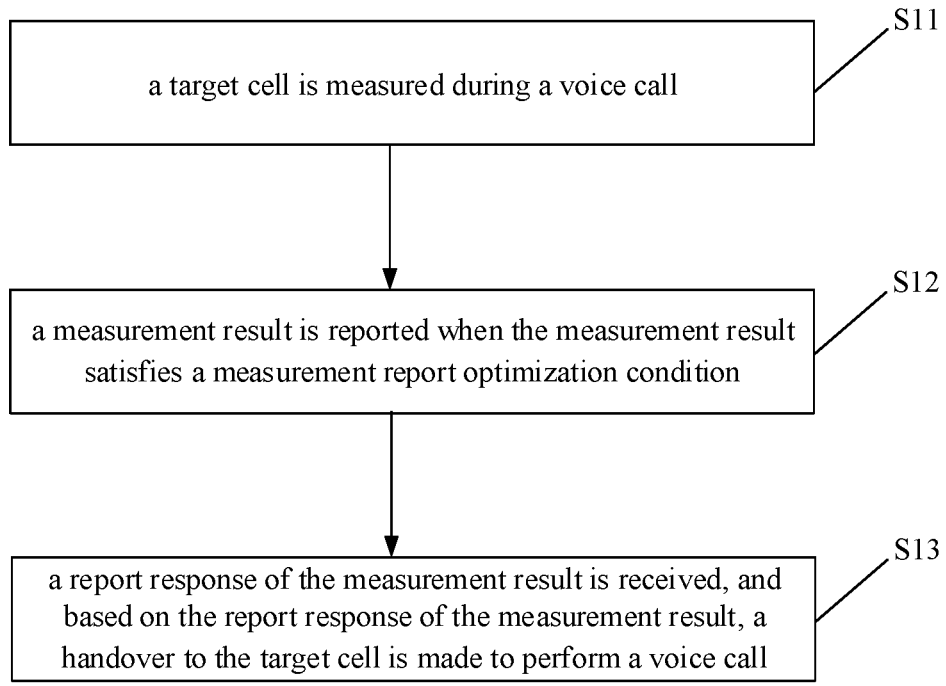
FIG. 2 is a flow chart showing a voice call control method according to an exemplary embodiment.

FIG. 2 is a flowchart illustrating a voice call control method according to an exemplary embodiment. As shown in FIG. 2, the voice call control method is used in a terminal and comprises the following steps S11 to S13.

In step S11, a target cell is measured during a voice call.

In the present disclosure, the terminal needs to establish a voice call process, such as to establish a VoLTE voice call process. The process of establishing a voice call by the terminal in the present disclosure can adopt the existing technique, no limitation is made in the present disclosure.

After the terminal establishes a voice call, in order to meet the call quality during the voice call, a cell measurement is performed to make a handover to the target cell for a voice call. Therefore, in the present disclosure, the terminal performs the cell measurement, which can also be understood as measuring the target cell.

In step S12, a measurement result is reported when the measurement result satisfies a measurement report optimization condition.

In the present disclosure, the terminal needs to determine the measurement report optimization condition in advance. Herein, it is included in the measurement report optimization condition to improve a measurement report condition for the terminal to make a handover to an anchor cell with the current network type, so as to increase the probability that the network type of the target cell to which the terminal makes a handover is the same as the current network type of the voice call made by the terminal, thereby reduce the probability of occurrence of the abnormal voice calls.

The anchor cell with the current network type in the present disclosure can be understood as a cell operating over a specified band. In some embodiments of the present disclosure, the current network type of the terminal can be, for example, a 5G NR network type. The anchor cell having the current network type can be, for example, a cell operating in a Frequency Division Duplexing frequency division duplex (FDD) band. The FDD band can be, for example, a B3 band and an N78 band.

In step S13, a report response of the measurement result is received, a handover to the target cell is made to perform a voice call based on the report response of the measurement result.

In the present disclosure, after the terminal reports the measurement result, the network device determines whether to control the terminal to perform cell handover based on the measurement result reported by the terminal, and sends a report response to the measurement result to the terminal. The report response of the measurement result indicates whether the handover to the target cell is performed. The present disclosure is mainly directed at the scenario in which the handover to the target cell is performed. After receiving the report response of the measurement result, the terminal determines that the handover to the target cell is required based on the report response of the measurement result, and then a handover to the target cell is made for a voice call.

In the present disclosure, since the terminal reports the measurement result when the measurement result satisfies the measurement report optimization condition, the probability that the network type of the target cell to which the terminal makes a handover is the same as the network type of the current voice call made by the terminal is increased, and the probability of abnormality occurrence of voice call caused by cell handover is reduced.

The above-mentioned voice call process will be described below in combination with practical applications in the present disclosure.

In the present disclosure, the measurement report optimization condition needs to be determined before the terminal reports the measurement result. The process that the terminal determines the measurement report optimization condition will be described below in the present disclosure.

Figure 3:
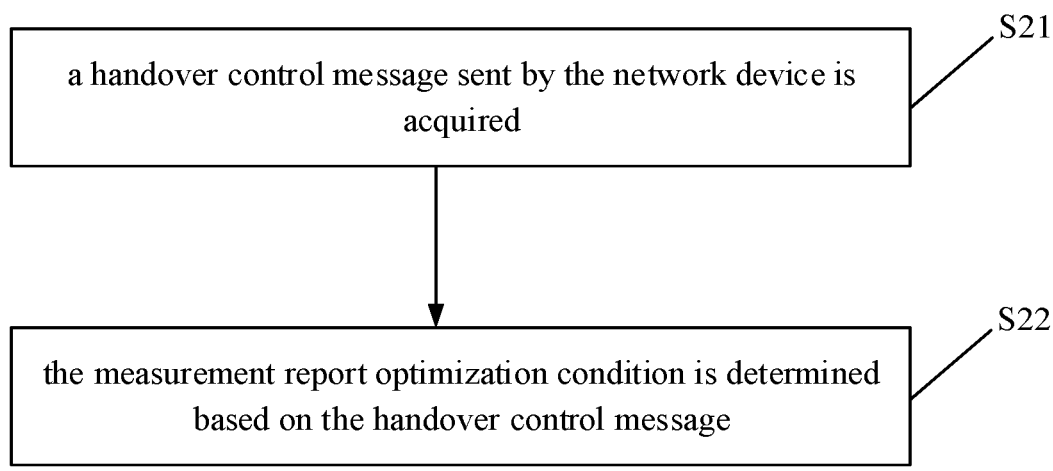
FIG. 3 is a schematic diagram illustrating a method for determining a measurement report optimization condition according to an exemplary embodiment.

FIG. 3 is a schematic diagram illustrating a method for determining a measurement report optimization condition according to an exemplary embodiment. As shown in FIG. 3, the method for determining a measurement report optimization condition is used in a terminal, and includes the following steps S21 to S22.

In step S21, a handover control message sent by the network device is acquired.

In an implementation of the present disclosure, the measurement report optimization condition for the terminal to report the measurement result is configured by the network device. In some embodiments, the network device can carry the measurement report optimization condition in a handover control message sent to the terminal. The terminal acquires the handover control message sent by the network device, and determines the measurement report optimization condition based on the handover control message.

In step S22, the measurement report optimization condition is determined based on the handover control message.

Figure 4:
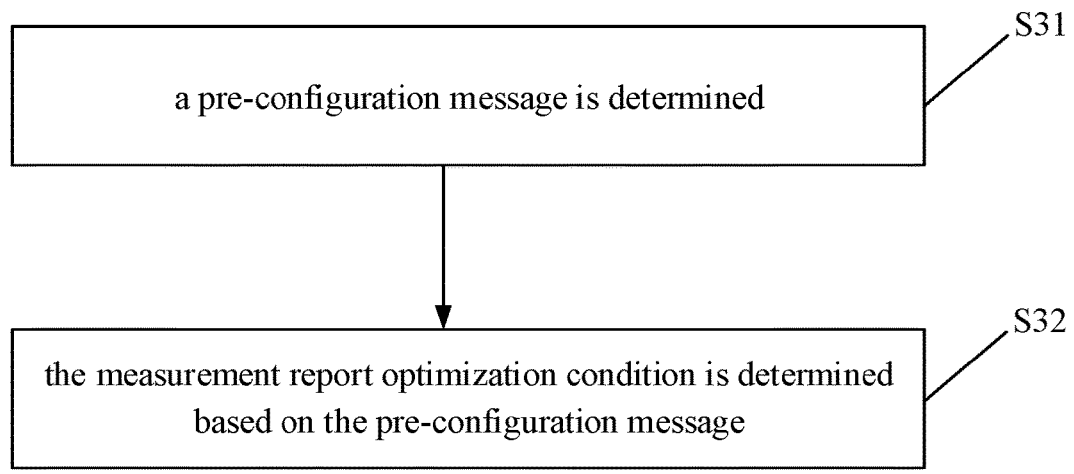
FIG. 4 is a schematic diagram illustrating a method for determining a measurement report optimization condition according to an exemplary embodiment.

FIG. 4 is a schematic diagram illustrating a method for determining a measurement report optimization condition according to an exemplary embodiment. As shown in FIG. 4, the method for determining a measurement report optimization condition is used in a terminal, and includes the following steps S31 to S32.

In step S31, a pre-configuration message is determined.

In an implementation of the present disclosure, the measurement report optimization condition is pre-configured by adopting a pre-configuration manner. In some embodiments, a pre-configuration message is defined in advance on a terminal side in the present disclosure, and the measurement report optimization condition for the terminal to report the measurement result is set in the pre-configuration message. The terminal determines the measurement report optimization condition based on the pre-configured message.

In step S32, the measurement report optimization condition is determined based on the pre-configuration message.

In the present disclosure, the measurement report optimization condition is determined by the network device on the one hand, and determined by the terminal in a pre-configured manner on the other hand, thereby various implementation modes are provided.

The examples that the measurement report optimization condition for the terminal to make a handover to an anchor cell with the current network type can be improved will be explained below in the present disclosure.

In an implementation, a priority at which the terminal reports an anchor cell with a non-current network type can be reduced in the present disclosure, so that the priority at which the terminal reports an anchor cell with a non-current network type is lower than a priority at which the terminal reports an anchor cell with the current network type, thereby increasing the probability of the terminal making a handover to an anchor cell with the current network type. In this case, there is included in the measurement report optimization condition a priority at which the terminal reports an anchor cell with a non-current network type. Herein, the priority at which the terminal reports an anchor cell with a non-current network type is lower than a priority at which the terminal reports an anchor cell with the current network type.

In some embodiments, the current network type of the terminal is 5G NR, the anchor cell with the current network type can be understood as a cell operating in the FDD band, and the anchor cell with the non-current network type can be understood as a cell operating in the TDD band. The measurement control messages configured by the network device include cases where the terminal measures cells in the FDD band and the TDD band. The measurement report optimization condition includes reducing the priority at which the terminal reports the TDD band cell, so that the priority at which the terminal reports the TDD band cell is lower than the priority at which the terminal reports the FDD band cell, thereby increasing the probability for the terminal to report the FDD band cell, so as to improve the probability of the terminal making a handover to the FDD band cell.

In another implementation, a voice quality report threshold for the terminal to report when a voice call is performed in an anchor cell with a non-current network type can be increased in the present disclosure, so that the voice quality report threshold when the terminal performs a voice call in an anchor cell with a non-current network type is higher than a voice quality report threshold when the terminal performs a voice call in an anchor cell with a current network type. By increasing the voice quality report threshold when the terminal performs a voice call in an anchor cell with a non-current network type, the probability for the terminal to report the anchor cell with a non-current network is reduced, and the probability for the terminal to report the anchor cell with a current network type is increased. In this case, the measurement report optimization condition includes: a voice quality report threshold when the terminal performs a voice call in an anchor cell with a non-current network type. Herein, the voice quality report threshold when the terminal performs a voice call in an anchor cell with a non-current network type is higher than a voice quality report threshold when the terminal performs a voice call in an anchor cell with a current network type It can be understood that, the voice quality of the terminal when performing a voice call can be determined by using measurement values of signals such as RSRP, RSRQ, etc. In other words, increasing the voice quality report threshold for the terminal to report when performing a voice call in the anchor cell with a non-current network type can also be understood as increasing the report threshold for the terminal to report the signals such as RSRP, RSRQ, etc. which are measured in the anchor cell with a non-current network.

In some embodiments, the current network type of the terminal is 5G NR, an anchor cell with the current network type can be understood as a cell operating in the FDD band. An anchor cell with the non-current network type can be understood as a cell operating in the TDD band. The measurement control message configured by the network device includes a case where the terminal measures the cells operating in the FDD band and the TDD band. The measurement report optimization condition includes increasing the voice quality threshold for the terminal to report the TDD band cell. For example, the voice quality threshold for the terminal to report the TDD band cell is increased by 5 dB based on an original threshold.

In the above disclosure, a priority at which the terminal reports an anchor cell with a non-current network type is decreased or a voice quality report threshold when the terminal performs a voice call in an anchor cell with a non-current network type is increased, so that it is easier for the terminal to report the anchor cell with the current network type, and thus the success rate of the terminal making the handover to the anchor cell with the current network type can be improved.

The voice call control method provided by the present disclosure makes it easier for the terminal to make a handover to a target cell under the same network type as the current network type when a cell handover occurs during a voice call made by the terminal, thereby reducing the probability of occurrence of the abnormal voice calls caused by different network types of the target cells.

Further, in the voice call control method according to the foregoing embodiments of the present disclosure, the terminals perform voice call control based on the network type used by the current voice call. Therefore, in the embodiments of the present disclosure, before the terminal reports the measurement results, it needs to determine the current network type in which the terminal is currently conducting a voice call. For example, it is determined whether the current network type of the terminal is a 5G NR network type. When it is determined as the 5G NR network type, the current network type of the terminal is identified by way of flag setting. For example, the 5G NR flag is labeled as 1 to indicate that the current network type is the 5G NR network type.

Based on the same concept, the embodiments of the present disclosure further provide a voice call control device.

It can be understood that, in order to achieve the above functions, the voice call control device provided by the embodiments of the present disclosure includes hardware structures and/or software modules corresponding to respective functions. With reference to the units and algorithm steps of individual examples disclosed in the embodiments of the present disclosure, the embodiments of the present disclosure can be implemented in the form of hardware or a combination of hardware and computer software. Whether a certain function is performed by hardware or computer software-driven hardware depends on the specific application and design constraints of the technical solutions. Those skilled in the art may use different methods to implement the described functions for each specific application, but such implementation should not be considered to go beyond the scope of the technical solutions of the embodiments of the present disclosure.

Figure 5:
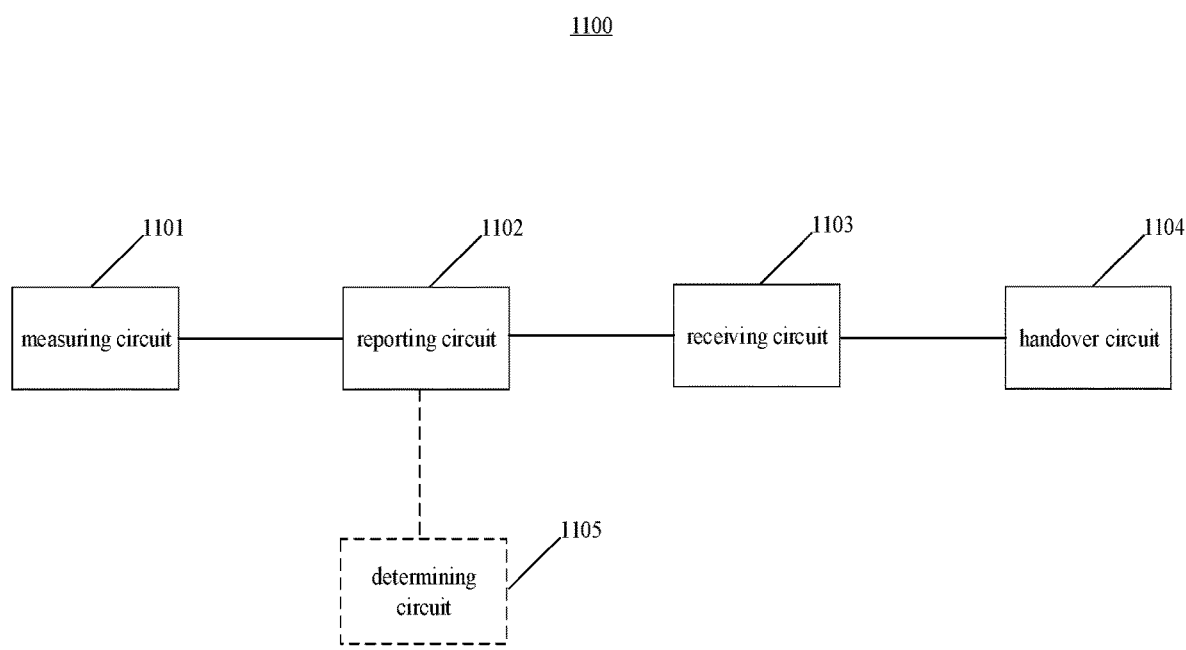
FIG. 5 is a block diagram of a voice call control device according to an exemplary embodiment.

FIG. 5 is a block diagram of a voice call control device 1100 shown according to an exemplary embodiment. The voice call control device 1100 can be applied to a terminal. The voice call control device 1100 may be a mobile phone, a computer, a digital broadcast terminal, a messaging device, a gaming console, a tablet, a medical device, exercise equipment, a personal digital assistant, and the like.

Referring to FIG. 5, the voice call control device 1100 includes a measuring unit 1101, a reporting unit 1102, a receiving unit 1103, and a handover unit 1104. Herein, the measuring unit 1101 is configured to measure a target cell during a voice call. The reporting unit 1102 is configured to report a measurement result when the measurement result satisfies a measurement report optimization condition. Herein, it is included in the measurement report optimization condition to improve a measurement report condition for the terminal to make a handover to an anchor cell with a current network type. The receiving unit 1103 is configured to receive a report response of the measurement result. The handover unit 1104 is configured to make a handover to the target cell to perform a voice call based on the report response of the measurement result.

In an implementation, the voice call control device 1100 further includes a determining unit 1105. The determining unit 1105 is configured to acquire a handover control message sent by a network device, and determine the measurement report optimization condition based on the handover control message. Herein, the handover control message includes the measurement report optimization condition. Alternatively, the determining unit 1105 is configured to determine the measurement report optimization condition according to a pre-configuration message. The pre-configuration message includes the measurement report optimization condition.

In an implementation, the measurement report optimization condition includes: a priority at which the terminal reports an anchor cell with a non-current network type. Herein, the priority at which the terminal reports an anchor cell with a non-current network type is lower than a priority at which the terminal reports an anchor cell with the current network type.

In an implementation, the measurement report optimization condition includes: a voice quality report threshold when the terminal performs a voice call in an anchor cell with a non-current network type. Herein, the voice quality report threshold when the terminal performs a voice call in an anchor cell with a non-current network type is higher than a voice quality report threshold when the terminal performs a voice call in an anchor cell with a current network type.

In an implementation, the anchor cell with the non-current network type is a cell operating in the time division duplex band, and the anchor cell with the current network type is a cell operating in the frequency division duplex band.

In an implementation, the current network type is a 5G new radio network type.

With respect to the devices in the above embodiments, the specific manners for performing operations for individual modules therein have been described in detail in the embodiments regarding the methods, which will not be elaborated herein.

Figure 6:
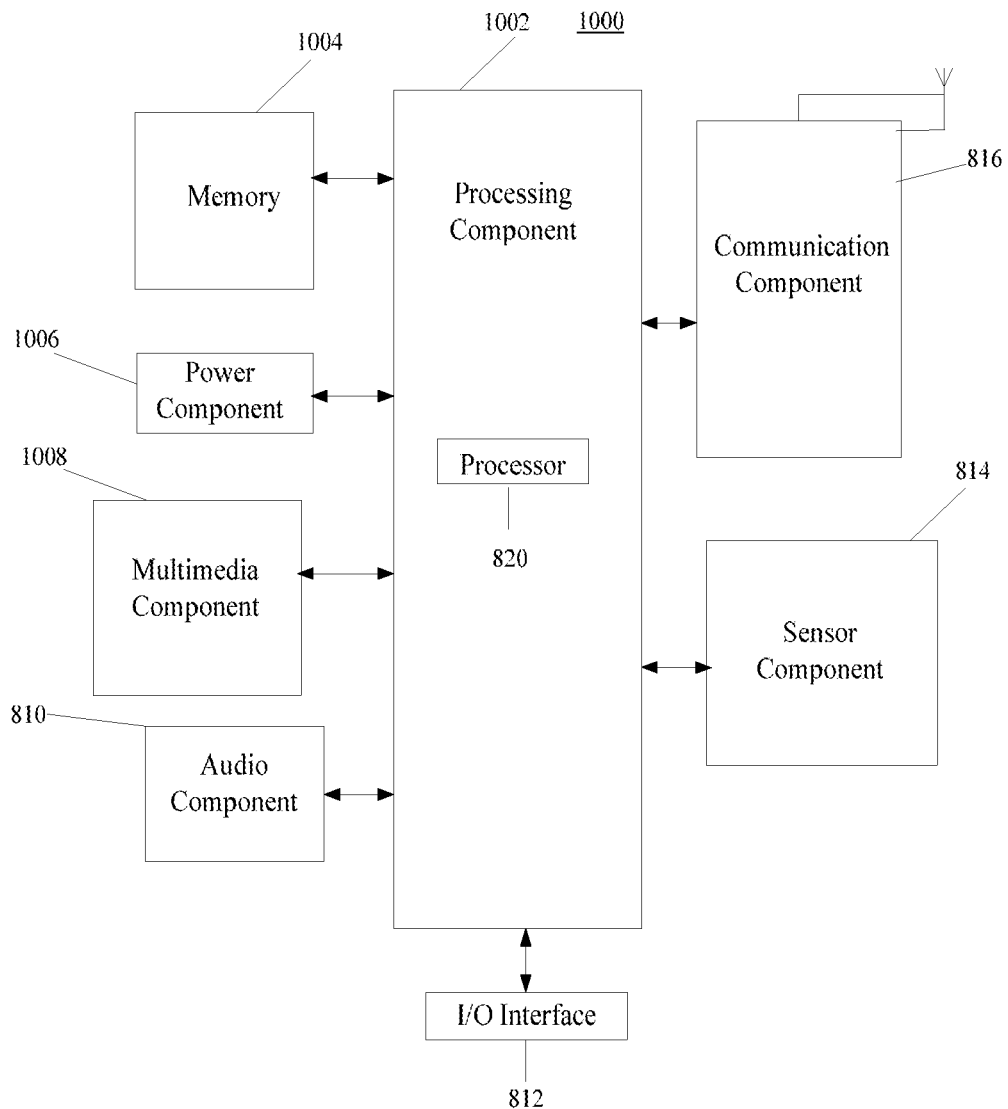
FIG. 6 is a block diagram of a device according to an exemplary embodiment.

FIG. 6 is a block diagram of a device 1000 for voice call control according to an exemplary embodiment. For example, the device 1000 can be a mobile phone, a computer, a digital broadcast terminal, a messaging device, a gaming console, a tablet, a medical device, fitness equipment, a personal digital assistant, and the like.

Referring to FIG. 6, the device 1000 can include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 can include one or more processors 1020 to execute instructions to perform all or part of the steps in the above described methods. Moreover, the processing component 1002 can include one or more modules which facilitate the interaction between the processing component 1002 and other components. For instance, the processing component 1002 can include a multimedia module to facilitate the interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, video, etc. The memory 1004 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power in the device 1000.

The multimedia component 1008 includes a screen providing an output interface between the device 1000 and the user. In some embodiments, the screen can include a liquid crystal display (LCD) and a touch panel (TP). In some embodiments, an organic light-emitting diode (OLED) display or other types displays can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also detect a period of time and a pressure associated with the touch or swipe action. In some embodiments, the multimedia component 1008 includes a front camera and/or a rear camera. The front camera and the rear camera can receive an external multimedia datum while the device 1000 is in an operation mode, such as a photographing mode or a video mode. Each of the front camera and the rear camera can be a fixed optical lens system or have focus and optical zoom capability.

The audio component 1010 is configured to output and/or input audio signals. For example, the audio component 1010 includes a microphone ("MIC") configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the device 1000. For instance, the sensor component 1014 can detect an open/closed status of the device 1000, relative positioning of components, e.g., the display and the keypad, of the device 1000, and the sensor component 1014 can also detect a change in position of the device 1000 or a component of the device 1000, a presence or absence of user contact with the device 1000, an orientation or an acceleration/deceleration of the device 1000, and a change in temperature of the device 1000. The sensor component 1014 can include a proximity sensor configured to detect the presence of nearby objects without any physical contact. The sensor component 1014 can also include a light sensor, such as a CMOS or CCD image sensor, for use in imaging applications. In some embodiments, the sensor component 1014 can also include an accelerometer sensor, a gyroscope sensor, a magnetic sensor, a pressure sensor, or a temperature sensor.

The communication component 1016 is configured to facilitate communication, wired or wirelessly, between the device 1000 and other devices. The device 1000 can access a wireless network based on a communication standard, such as Wi-Fi, 2G, 3G, 4G, 5G, and a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In exemplary embodiments, there is also provided a non-transitory computer readable storage medium including instructions, such as the memory 1004 including instructions, executable by the processor 1020 in the device 1000, for performing the above-described methods. For example, the non-transitory computer-readable storage medium may be a ROM, a RAM, a CD-ROM, a magnetic tape, a floppy disc, an optical data storage device, and the like.

Various embodiments of the present disclosure can have one or more of the following advantages: during a voice call, a measurement result is reported when the measurement result satisfies a measurement report optimization condition. It is included in measurement report optimization condition to improve a measurement report condition for the terminal to make a handover to an anchor cell with a current network type, thereby the probability of the terminal to perform a voice call over the anchor network with the same network type is increased, and the probability of occurrence of silence or disconnection during a voice call is reduced.

It can be understood that, "network" and "system" are sometimes used interchangeably in the present disclosure, but those skilled in the art can understand the meaning thereof.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

It can be further understood that, although the operations in the embodiments of the present disclosure are described in a specific order in the drawings, they should not be understood as requiring that the operations should be performed in the specific order or serial order shown, or requiring that all the operations shown should be performed to get the desired result. In certain environments, multitasking and parallel processing may be advantageous.

Other implementations of the disclosure will be apparent to those skilled in the art from consideration of the specification and practice of the invention disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

The invention claimed is:

1. A voice call control method, applied to a terminal, and the method comprising:
   measuring a target cell during a voice call;
   acquiring a measurement report optimization condition by optimizing a measurement report condition for the terminal to report a measurement result during a voice call;
   reporting a measurement result when the measurement result satisfies the measurement report optimization condition, wherein the report optimization condition is configured to improve a measurement report condition for the terminal to make a handover to an anchor cell with a current network type to increase probability of the terminal making the handover to the anchor cell with the current network type; and
   receiving a report response of the measurement result and making a handover to the target cell to perform a voice call based on the report response of the measurement result.

2. The voice call control method according to claim 1, wherein the method further comprises:
   acquiring a handover control message sent by a network device, and determining the measurement report optimization condition based on the handover control message including the measurement report optimization condition.

3. The voice call control method according to claim 1, wherein the method further comprises:
   determining the measurement report optimization condition according to a pre-configuration message including the measurement report optimization condition.

4. The voice call control method according to claim 1, wherein the measurement report optimization condition includes:
   a voice quality report threshold when the terminal performs a voice call in an anchor cell with a non-current network type;
   wherein the voice quality report threshold when the terminal performs a voice call in an anchor cell with a non-current network type is higher than a voice quality report threshold when the terminal performs a voice call in an anchor cell with a current network type.

5. The voice call control method according to claim 4, wherein the anchor cell with the non-current network type is a cell operating in the time division duplex band, and the anchor cell with the current network type is a cell operating in the frequency division duplex band.

6. The voice call control method according to claim 1, wherein the anchor cell with the non-current network type is a cell operating in the time division duplex band, and the anchor cell with the current network type is a cell operating in the frequency division duplex band.

7. The voice call control method according to claim 6, wherein the current network type is a 5G new radio network type.

8. A non-transitory computer-readable storage medium having instructions stored thereon for execution by a processor of a mobile terminal to enable the mobile terminal to perform the voice call control method according to claim 1.

9. A mobile terminal implementing the voice call control method according to claim 1, wherein the mobile terminal is configured to make the handover to the anchor cell with the current network type based on the reported measurement result, to thereby reduce a probability of occurrence of silence or disconnection during the voice call.

10. The mobile terminal according to claim 9, further comprising a display screen, a microphone, and a speaker.

11. The mobile terminal according to claim 10, further comprising a processing circuit, and a non-transitory computer-readable storage medium having instructions stored thereon for execution by the processing circuit to enable the mobile terminal to perform the voice call control method.

12. The voice call control method according to claim 1, wherein the measurement report optimization condition includes:
   a priority at which the terminal reports the measurement result of an anchor cell with a non-current network type;
   wherein the priority at which the terminal reports the measurement result of an anchor cell with a non-current network type is lower than a priority at which the terminal reports the measurement result of an anchor cell with the current network type.

13. A voice call control device, applied to a terminal, and the device comprising:
   a processor configured to:
   measure a target cell during a voice call;
   acquiring a measurement report optimization condition by optimizing a measurement report condition for the terminal to report a measurement result during a voice call;
   report a measurement result when the measurement result satisfies the measurement report optimization condition in which it is included to improve a measurement report condition for the terminal to make a handover to an anchor cell with a current network type to increase probability of the terminal making the handover to the anchor cell with the current network type; and
   receive a report response of the measurement result and make a handover to the target cell to perform a voice call based on the report response of the measurement result.

14. The voice call control device according to claim 13, wherein the processor is further configured to:
   acquire a handover control message sent by a network device, and determine the measurement report optimization condition based on the handover control message including the measurement report optimization condition.

15. The voice call control device according to claim 13, wherein the processor is further configured to:
   determine the measurement report optimization condition according to a pre-configuration message including the measurement report optimization condition.

16. The voice call control device according to claim 13, wherein the measurement report optimization condition includes:
   a voice quality report threshold when the terminal performs a voice call in an anchor cell with a non-current network type;
   wherein the voice quality report threshold when the terminal performs a voice call in an anchor cell with a non-current network type is higher than a voice quality report threshold when the terminal performs a voice call in an anchor cell with a current network type.

17. The voice call control device according to claim 16, wherein the anchor cell with the non-current network type is a cell operating in the time division duplex band, and the anchor cell with the current network type is a cell operating in the frequency division duplex band.

18. The voice call control device according to claim 16, wherein the current network type is a 5G new radio network type.

19. The voice call control device according to claim 13, wherein the anchor cell with the non-current network type is a cell operating in the time division duplex band, and the anchor cell with the current network type is a cell operating in the frequency division duplex band.

20. The voice call control device according to claim 13, wherein the measurement report optimization condition includes:
- a priority at which the terminal reports the measurement result of an anchor cell with a non-current network type;
- wherein the priority at which the terminal reports the measurement result of an anchor cell with a non-current network type is lower than a priority at which the terminal reports the measurement result of an anchor cell with the current network type.

\* \* \* \* \*